United States Patent [19]

Villagran et al.

[11] Patent Number: 5,366,748
[45] Date of Patent: * Nov. 22, 1994

[54] METHOD OF PRODUCTION OF EXTRUDED CEREAL GRAIN-BASED FOOD PRODUCTS HAVING IMPROVED QUALITIES

[75] Inventors: Maria D. Villagran; David A. Lanner; Lori J. Toman; Martin A. Mishkin; Nancy C. Dawes, all of Cincinnati, Ohio

[73] Assignee: The Procter & Gamble Company, Cincinnati, Ohio

[*] Notice: The portion of the term of this patent subsequent to Nov. 8, 2011 has been disclaimed.

[21] Appl. No.: 943,833

[22] Filed: Sep. 14, 1992

[51] Int. Cl.$^5$ ............................ A23L 1/10; A23P 1/12
[52] U.S. Cl. ................................ 426/549; 426/439; 426/516; 426/573; 426/656; 426/808
[58] Field of Search ............... 426/549, 439, 808, 516, 426/656, 573

[56] References Cited

U.S. PATENT DOCUMENTS

| | | |
|---|---|---|
| 3,655,385 | 4/1972 | Rubio . |
| 4,064,282 | 12/1977 | Hallstrom et al. . |
| 4,259,359 | 3/1981 | Spicer ........................ 426/808 |
| 4,517,204 | 5/1985 | Mottur et al. ............... 426/808 |
| 4,645,679 | 2/1987 | Lee, III et al. . |
| 4,950,490 | 8/1990 | Ghiasi et al. . |
| 5,147,675 | 9/1992 | Gage et al. .................. 426/808 |

*Primary Examiner*—Donald E. Czaja
*Assistant Examiner*—Mary S. Mims
*Attorney, Agent, or Firm*—William J. Winter; George W. Allen

[57] ABSTRACT

An improved method for the production of extruded cereal grain-based fried food products having improved qualities is provided. In the improved method, the cereal grain-based food product is formed by extrusion of a cereal grain dough mass containing a gum such as carboxymethyl cellulose and optionally a protein, followed by frying the extruded cereal grain dough to produce a fried cereal grain food product having reduced gumminess or toothpacking and grittiness.

9 Claims, No Drawings

METHOD OF PRODUCTION OF EXTRUDED CEREAL GRAIN-BASED FOOD PRODUCTS HAVING IMPROVED QUALITIES

BACKGROUND OF THE PRESENT INVENTION

The present invention is directed to a method for the production of an extruded cereal grain-based fried food product.

As described by Matz, Snack Food Technology, conventional corn chip processes begin with a corn meal or corn masa. Both white and yellow corn of the dent type are added to a vat containing heated water and a proportionate amount of lime. The mixture is heated to the boiling point, the heat is cut off, and the contents of the vat are permitted to stand undisturbed for 10 to 20 hours. During this time, the corn hulls are hydrated and partially hydrolyzed. The hulls are softened to a jelly-like consistency and are easily removed later in the process. The starch is also gelatinzed. By the end of the steeping period, the corn kernels have absorbed approximately 50% by weight water. The hulls are removed in a washer by jets of water which also remove any remaining lime. The washed kernels are then transferred to a stone mill where they are ground into a dough or masa. The masa is formed (usually by hand) into large cylindrical loaves and fed into hydraulically powered extrusion presses. The cylindrical chamber of the press contains a closely fitting piston which forces the dough through a die plate having a series of slot-like ports. A cutting device severs the extruded strands into pieces. Alternatively, the dough can be rolled out into a thin sheet from which shapes can be cut. Dough pieces fall directly into heated cooking oil. After the moisture content of the cut dough has been reduced to about a few percent, the resulting cooked corn product is salted, cooled, and packaged.

Such conventional processes of producing corn chips suffer from various disadvantages including the fact that the chips are gritty and subject to toothpacking.

One method of addressing such disadvantages is described in commonly-assigned U.S. Pat. No. 4,645,679 which describes a method for the production of corn chips which involves comminuting a hydrated starch material such as potato starch with hydrated corn.

OBJECTS AND SUMMARY OF THE PRESENT INVENTION

It is accordingly one object of the present invention to provide a method for the production of an extruded fried cereal grain-based food product which does not suffer from grittiness and toothpacking or gumminess as do some cereal grain products of the prior art.

In accordance with the present invention, there is thus provided an improved method for the production of a cereal grain-based fried extruded food product comprising the steps of:

feeding cereal grain flour and water together with a gum and optionally a protein to an extruder;
extruding said admixture to form a dough;
forming said dough into a sheet and cutting said sheet into multiple segments of desired shape; and
deeping frying said segments to form said food product.

DETAILED DESCRIPTION OF THE PRESENT INVENTION

The present invention will described in terms of the use of corn, although as described below, the present invention is easily applicable to various other cereal grains such as wheat, rice, barley, and oats, and is not intended to be limited in scope or content to the use of corn. Exemplary corn grains include those formed from both yellow and white corn. Mixtures of such grain sources can also be employed with advantage.

The present invention enables corn chips (such as tortilla chips) to be produced which may be described as crisp with a high degree of lubricity, fast mouthmelt and reduced hardness. Such products have a distinctive corn flavor of moderate intensity.

Tortillas are generally considered to be comprised of a mixture of flour, water, salt and oil to form a dough which is then sheeted and cut into the conventional tortilla shape and size.

Conventionally, in contrast to the present invention, such products are baked and optionally additionally fried in order to form the desired end product. However, as discussed in detail below, it has been found that frying the dough in the absence of a baking step having a composition as described herein can result in the production of a highly desirable product which has a tortilla-like structure.

An acceptable corn or cereal grain flour can be produced by any method which yields an acceptable comminuted product, such as grinding. It is particularly advantageous in terms of texture to comminute the corn by cutting with a cutting mill such as an Urschel Comitrol, manufactured by Urschel Laboratories, Inc. of Valparaiso, Ind. See U.S. Pat. No. 3,728,311 which describes the use of such a cutting mill in the comminuting of corn.

The cereal grain which is used in practice of the present invention comprises in major proportion raw or native cereal grain flour which has not been precooked or pregelatinized, and may contain up to about 40% by weight (dry basis) of partially precooked or pregelatinized cereal grain. By partially gelatinized is meant cereal grain which is approximately 70–80% gelatinized.

In accordance with the present invention, a heat-stable gum or gum system is compounded with the dough in order to provide a gum-containing dough. Representative gums or gum systems include but are not limited to sodium carboxymethylcellulose, guar gum, methylcellulose, xanthan gum, sodium alginate and pectin, and the like. Such gums may be rendered heat stable by the presence of polyvalent metal ions.

The gum or gum system is blended with the corn flour and water together with any protein additive and any other optional ingredients while being added to the extruder in an amount of from about 0.1 to about 3.0% by weight (dry weight), and preferably in an amount of about 1.0% by weight (dry weight).

In the noted blend, the cereal grain flour is generally present in an amount within the range of from 70 to 95 percent by weight (dry basis).

It has been surprisingly found that the presence of the gum or gum system in the dough enables a product to be prepared by the process of the present invention which exhibits less grittiness and toothpacking than a corresponding product prepared without the gum or gum system.

Normally, during the extrusion of a dough containing starch/protein blends, such as the dough used to form the products of the present invention, the starch and protein compete for water present in the dough. Upon heating, the protein absorbs water faster than the starch. This consequence results in the formation of an extruded product which may have a starchy aftertaste, and exhibits grittiness and toothpacking characteristics.

It has been found, however, that the addition of a gum or gum system consistent with the present invention reduces the ability of the protein to absorb water in competition with starch, as the gum complexes with the protein. More specically, for example, carboxymethylcellulose exhibits a negative charge which is neutralized by the positive charge of the protein. The starch component of the dough is thus permitted to hydrate properly without undue competition for the available water from the protein.

The presence of the gum or gum system also assists the protein to disperse properly throughout the dough, due to its ability to form a complexing network with the protein molecules.

The presence of the gum or gum system further enables a product to be produced which has an improved texture and appearance. For instance, during the frying step, the gum or gum system encourages delamination of the product which enhances the ability of the water absorbed by the dough to be evaporated from the interior of the dough to form a multi-layered or delaminated product. This result enhances the ability of the frying oil during the frying step to enter the porous structure of the extruded dough to ensure that the interior portions of the dough are cooked.

U.S. Pat. No. 3,655,385 discloses the presence of hydrophilic gums such as carboxymethylcellulose in tortillas. However, this patent focuses upon the production of tortillas by baking the tortilla dough, and is silent with regard to the use of frying to form the tortillas in contrast to the present invention. This patent also requires, in contrast to the present invention, that the corn be subjected to an alkaline treatment. Such a step is avoided by the present invention.

As noted above, it may also be advantageous to include a suitable protein in the dough-forming composition by addition to the extruder together with the flour and gum components.

Exemplary protein sources include but are not limited to soy protein concentrate and isolate, pea protein, corn protein (zein), rice protein or dairy proteins (such as lactalbumin, casein, whey solids and non-fat dry milk), as well as mixtures thereof.

Such protein sources are generally employed with advantage in amounts ranging from about 4.5 to about 25 percent by weight (dry basis). The extrusion process yields a dough which is subjected to additional work input to enhance hydration and gelatization of the corn, to reduce grittiness of the finished corn chip, and to improve cohesiveness of the dough.

Such additional work input is provided by extruding the dough in an extruder. The extrusion step is undertaken at a temperature in the range of from about 190° to 360° F. (barrel temperature of the extruder) for a residence time of from about 1 to 4 minutes.

Any conventional cooking extruder can be employed for such extrusion, although it is preferred that a twin screw extruder be employed.

The extrusion temperature is a function of both the extruder jacket temperature and the amount of work input to the dough. Extrusion imparts both mechanical work and compression-type work to the dough.

The extruded dough having a thickness in the range of from 0.25 to 0.60 inch is next formed into a sheet. While the dough may be milled in any workable manner, acceptable results have been obtained by milling the dough with multiple sequential conventional two-roll mills. These sheeting rolls comprise front roll and a back roll which rotate about generally parallel longitudinal axes. The back roll has a diameter slightly larger than that of the front roll.

A milled-dough is thus produced having a thickness on the order of from about 0.020 to 0.040 inches. While the thickness of the resulting sheet is not critical, it is desirable to avoid production of sheet which is too thick to avoid adversely affecting the mouthmelting characteristic of the product.

After the dough is milled into a sheet, dough pieces or segments are formed from the sheet. Typically, dough segments are formed by cutting the sheet into pieces of desired shape and size. For example, segments can be formed having the rectangular shape of most commercial corn chips, or the triangular, oval or round shape of tortilla chips.

The thus-produced segments are then deep-fried in oil by conventional means. Any kind of frying oil may be used, such as vegetable oil or animal fat. The oil or fat can be hydrogenated. Suitable oils include corn oil, soybean oil, palm oil, sunflower seed oil, and mixtures thereof. Suitable animal fats include lard and tallow. Marine fats and oils such as menhaden can be used. The above list is merely exemplary and not intended to be inclusive.

Preferably, a frying temperature of from about 375° to 390° F. is employed.

The finished chips are crisp, delaminated, non-gritty, and lubricious. The fat content of the chips can be between about 25% to about 27% by weight, preferably about 25% by weight.

Salt or other flavor enhancers or seasonings may be applied to the finished corn chip. Preferably, the corn chip has from about 0.8 to 1.4 % by weight of salt, and most preferably about 1.5% by weight of salt. Other flavor enhancers and seasonings that can be used are salt substitutes, such as potassium chloride, ammonium chloride, seasoning salt, and herbal salts. Cheeses and synthetic cheese flavors can also be employed.

EXAMPLE 1

Tortilla-like White Popcorn Chip

A blend as defined below was prepared in a batch blender to form a well-dispersed flour using a mixing time of 15 minutes:

| Ingdient | % (D.B.) |
| --- | --- |
| white popcorn | 86.04 |
| soy protein concentrate | 12.26 |
| sodium carboxymethylcellulose | 1.5 |
| acetylated monoglycerides | 0.2 |

The blend is transferred by gravity to a K-tron feeder which feeds the blend to the first extruder at a ratio of 4/1 of dry solids and water. A dough is formed by mixing and work input which continues for a period of time of approximately 45 seconds. The twin screw moves at a speed of 300 rpm, causing the product to move forward toward the extruder die, which is connected to a constriction (causing back pressure). The incremental increase in pressure increases mechanical energy development in this stage of the process. At the end of the constriction is the entrance of the second extruder. From the exit of this extruder, rope of extrudate come through the die and are sheeted to form a cohesive/non-sticky dough. Extrusion of ground corn containing protein and carboxymethylcellulose produces extrudates that form strong elastic doughs able to withstand stretching during sheeting and forming. Protein changes the rheology of extrudates due to increased torque and pressure within the extruder. The sheet is cut and fried in corn oil. Finished chips are seasoned on one side after cooling. The fried chip has a pleasant corn flavor, and a light, expanded, delaminated structure with a uniform porosity, producing a tortilla-like texture.

Extrusion of corn without carboxymethylcelluose or protein forms a dough which at high water levels of 25 to 30% falls apart during sheeting and forming. The dough produces corn chips that do not have the expanded, delaminated structure seen with the addition of the protein and the carboxymethylcellulose components.

Products produced which do not contain the carboxymethylcellulose component were determined to be denser, drier, and show higher levels of grittiness and toothpacking than products containing both the protein and the carboxymethylcellulose.

EXAMPLE 2

The process of Example 1 was employed to produce a fried corn snack with an increased protein level; i.e., 18% protein based on the total dry solids, with the following blend being employed:

| Ingredient | % (D.B.) |
| --- | --- |
| yellow corn | 52.0 |
| partially precooked corn | 17.0 |
| soy protein isolate | 11.5 |
| soy protein concentrate | 12.0 |
| sodium carboxymethylcellulose | 1.4 |
| lysine-hydrochloride | 0.03 |
| calcium carbonate | 2.0 |
| maltodextrin | 3.0 |
| acetylated monoglycerides | 0.2 |

Calcium carbonate was added as a calcium fortification source.

The water-holding capacity of the dough was found to increase with the presence of protein. In order to sheet this dough (which was found to be tough and dry), the water levels were increased about 20%. High protein levels were found to increase the torque in both extruders. Therefore, the addition of the protein enhances the degree of cook in the first extruder by increasing the SME (specific mechanical energy). The finished chip presented a bubbly delaminated structure similar to a tortilla chip. The products were found to have a bland flavor and improved texture shown by increased crispiness and crunchiness.

However, the addition of very high levels of protein to the blend, as in the case of fortified snacks, resulted in products having slower breakdown during chewing. Toothpacking of products also increased. In this case, the CMC effect on toothpacking and mouthmelt is more important.

The extrusion temperature and screw speed, as well as the frying conditions, were the same as those used for low levels of protein.

EXAMPLE 3

Extrusion is a water-limited system, and although protein increases the water-holding capacity of the dough, there is still competition for the available water between protein, starch and the gum. The gum complexes the protein and allows the starch to absorb water and swell. Using the extrusion procedures of Example 1, and using the basic formulation of Example 2, levels of precooked yellow corn were used to partially replace the white popcorn to increase the hydration rate, ensure swelling and therefore increase gelatinization of the dough. The extrusion temperatures in the last 5 zones of the cooker were dropped to 220° F. from 360° F., to reduce the possibility of overworking the dough. Overworked doughs result in dense products with a gummy texture. This is the result of starch degradation (mainly amylopectin) during extrusion. The emulsifier level was increased to twice the level required to run a 100% blend of white popcorn. Only after these process steps occurred was an elastic, cohesive sheet obtained. It was found that the addition of approximately 25% of precooked corn in the blend enabled substantially optimum results to be achieved. The procedure of Example 1 was repeated with the following blends to form additional types of food products:

EXAMPLE 4

Tortilla-like Corn Chip

| Ingredient | % (D.B.) |
| --- | --- |
| yellow dent corn | 89.7 |
| soy protein isolate | 7.17 |
| sodium carboxymethylcellulose | 1.47 |
| acetylated monoglycerides | 0.2 |
| sugar | 1.44 |

EXAMPLE 5

Protein and Calcium Fortified Corn Chip

| Ingredient | % (D.B.) |
| --- | --- |
| yellow corn | 69.5 |
| soy protein concentrate | 12.0 |
| soy protein isolate | 12.0 |
| sodium carboxymethylcellulose | 1.4 |
| acetylated monoglycerides | 0.1 |
| lysine-hydrochloride | 0.03 |
| calcium carbonate | 2.0 |
| maltodextrin | 3.0 |

EXAMPLE 6

Multi-Grain Chip with Tortilla-like Appearance

| Ingredient | % (D.B.) |
| --- | --- |
| yellow corn | 50.0 |
| rice flour | 23.0 |
| wheat flour | 18.8 |
| soy protein isolate | 7.0 |
| sodium carboxymethylcellulose | 1.0 |
| acetylated monoglycerides | 0.2 |

EXAMPLE 7

Protein and Calcium Fortified Multi-Grain Chip

| Ingredient | % (D.B.) |
|---|---|
| yellow corn | 46.0 |
| rice flour | 20.0 |
| wheat flour | 14.8 |
| casein | 18.0 |
| sodium carboxymethylcellulose | 1.0 |
| acetylated monoglycerides | 0.2 |

EXAMPLE 8

Protein Fortified Multi-Grain Chip

| Ingredient | % (D.B.) |
|---|---|
| yellow corn | 50.0 |
| rice flour | 23.0 |
| wheat flour | 18.8 |
| non-fat dry milk | 7.0 |
| sodium carboxymethylcellulose | 1.0 |
| acetylated monoglycerides | 0.2 |

EXAMPLE 9

Multi-Grain Chip with Tortilla-like Appearance

| Ingredient | % (D.B.) |
|---|---|
| yellow corn | 50.0 |
| rice flour | 23.0 |
| wheat flour | 18.8 |
| soy protein isolate | 7.0 |
| sodium carboxymethylcellulose | 1.0 |
| acetylated monoglycerides | 0.2 |

Fried products have been examined by an expert sensory panel to determine eating quality, crispiness, crunchiness, etc. The panel evaluated each of the products produced in accordance with the procedures of Examples 4–9 above. Each attribute was rated on a nine point intensity scale. For example, when rating crispiness, a rating of 1 would indicate that the product was "not crisp", whereas a rating of 9 would mean that the product was "extremely crisp". With regard to mouthmelt (fast to slow) and toothpacking, a low number on the nine point scale is indicative of desirability.

The ratings of the expert sensory panel for the products of Examples 4–9 are summarized below in Table I:

TABLE I

Comparison of Effect of Gum and Protein in Corn Chip Product

| Sample | WPC | WPC + SPI | WPC + SPC | WPC + SPI/SPC + CMC |
|---|---|---|---|---|
| Ingredient | | | | |
| Total Protein (%) | 8 | 17 | 17.6 | 18 |
| Soy Protein (%) | | | | |
| isolate | 0 | 11 | 0 | 6 |
| concentrate | 0 | 0 | 16.5 | 8 |
| Sodium Carboxymethyl Cellulose (%) | 0 | 0 | 0 | 1 |
| Maltodextrin (%) | 0 | 0 | 2 | 2 |
| Fat (%) | 25 | 29 | 28 | 27 |
| Attributes | | | | |
| Crispiness | 5.4c | 6.7b | 6.8b | 7.4a |
| Crunchiness | 5.8b | 6.3ab | 6.0b | 6.6a |
| Mouthmelt/Breakdown | 4.7b | 4.5b | 5.2a | 4.3b |
| Toothpacking | 5.0a | 5.0a | 5.4a | 4.4b |
| Oily Texture | 3.7 | 3.5 | 3.6 | 3.4 |
| Gritty | 4.3 | 4.2 | 3.9 | 4.2 |
| Mouthcoating | 3.1 | 3.0 | 3.2 | 3.1 |
| Overall Flavor | 5.4 | 5.4 | 5.0 | 5.2 |
| Uncharacteristic Flavor | 2.1 | 2.1 | 2.2 | 1.8 |

Note: The abbreviation WPC denotes white popcorn
The abbreviation CMC denotes sodium carboxymethylcellulose
The abbreviation SPI denotes soy protein isolate
The abbreviation SPC denotes soy protein concentrate
The notations a, b and c denote the significance of the difference between the products The expert panel, upon sampling the products, concluded that the texture of products containing neither the added protein or the added gum were denser, drier, and showed higher levels of grittiness and toothpacking than did products containing protein and the added gum.

The flavor of products containing only the added protein was found to be pleasant, while having the appearance of tortilla chips. However, toothpacking, commonly detected in extruded corn products, was evident. Products containing the gum in addition to the protein exhibited reduced toothpacking without negatively affecting other attributes.

From the above data, it can also be concluded that the addition of soy protein isolate without the concurrent addition of carboxymethylcellulose increased the crispiness of the product, while permitting the product to exhibit a flavor similar to that of the control sample.

It can also be concluded from the Examples that the addition of the gum increases sheet strength and water-holding capacity which contributes to the delaminated texture, while also reducing toothpacking. The increase in water-holding capacity also results in high fat levels after frying. The higher fat content of the fried product provides an increased lubricity effect.

Using the procedure of Example 1, the following additional blends were prepared and tested by an expert sensory panel as summarized in the data summarized in Table II:

EXAMPLE 10

| Ingredient | % (D.B.) |
| --- | --- |
| white popcorn | 96.72 |
| sodium carboxymethylcellulose | 1.5 |
| sugar | 1.5 |
| acetylated monoglycerides | 0.2 |
| B-carotene | 0.08 |

EXAMPLE 11

| Ingredient | % (D.B.) |
| --- | --- |
| white popcorn | 90.72 |
| soy protein concentrate | 6.0 |
| sodium carboxymethylcellulose | 1.5 |
| sugar | 1.5 |
| acetylated monoglycerides | 0.2 |
| B-carotene | 0.08 |

EXAMPLE 12

| Ingredient | % (D.B.) |
| --- | --- |
| white popcorn | 88.57 |
| soy protein concentrate | 8.19 |
| sodium carboxymethylcellulose | 1.46 |
| sugar | 1.49 |
| acetylated monoglycerides | 0.21 |
| B-carotene | 0.08 |

TABLE II

Comparison of Effect of Gum and Protein in Corn Chip Product

| Sample | WPC + CMC | WPC + CMC + SPC | WPC + CMC + SPC |
| --- | --- | --- | --- |
| Total Protein (%) | 0.00 | 6.0 | 8.0 |
| Crispiness | 6.49 | 6.24 | 5.56b |
| Crunchiness | 6.63a | 6.02b | 5.56b |
| Mouthmelt/Breakdown | 4.56a | 4.46a | 3.88b |
| Toothpacking | 4.29 | 4.68 | 4.44 |
| Oily/Greasy | 3.24 | 3.12 | 3.10 |
| Gritty | 4.32a | 4.22a | 3.68b |
| Mouthcoating | 2.83 | 2.90 | 3.24 |
| Overall Flavor | 5.24 | 5.02 | 5.24 |
| Uncharacteristic Flavor | 1.41 | 1.46 | 1.34 |
| Acceptance | 5.76 | 5.90 | 5.68 |
| Corn Flavor | 5.05 | 4.73 | 4.76 |
| Saltiness | 3.93 | 4.27 | 4.24 |
| Oily Texture | 3.63 | 3.34 | 3.73 |

Note: The abbreviation WPC denotes white popcorn
The abbreviation CMC denotes sodium carboxymethylcellulose
The abbreviation SPC denotes soy protein concentrate
The notations a, b and c denote the significance of the difference between the products From the data of Table II it can be concluded that the increase of the amount of protein from 6 to 8% reduces grittiness exhibited by the product, while also producing a faster mouthmelt.

What is claimed is:

1. A process for the production of cereal grain-based extruded fried food product comprising the steps of:
   feeding cereal grain flour and water together with a gum and a protein source to an extruder;
   extruding said admixture to form a dough, said dough comprising from about 70 to 95 percent by weight (dry basis) of said cereal grain flour, from about 4.5 to 25 percent by weight of said protein source (dry basis), and from about 0.1 to about 3.0 percent by weight (dry basis) of said gum, said cereal grain flour comprised of non-pregelatinized cereal grain and the remainder from 0 up to about 40% by weight (dry basis) of partially pregelatinized cereal grain;
   forming said dough into a sheet and cutting said sheet into multiple segments of desired shape; and
   deep frying said segments to form said food product.

2. The process of claim 1 wherein said gum is selected from the group consisting of sodium carboxymethylcellulose, guar gum, methylcellulose, xanthan gum, sodium alginate and pectin.

3. The process of claim 2 wherein said gum is sodium carboxymethylcellulose.

4. The proces of claim 1, wherein said protein source is selected from the group consisting of soy protein concentrate and isolate, pea protein, corn protein, rice protein and dairy proteins.

5. The process of claim 4, wherein said protein source is soy protein isolate.

6. The process of claim 1, wherein said extrusion step occurs at a temperature in the range of from about 190° to 360° F.

7. The process of claim 1, wherein said frying step occurs at a temperature in the range of from about 375° to 390° F.

8. The process of claim 1, wherein said extruded dough is cut into the shape of tortilla chips.

9. A product produced by the process of claim 1.

* * * * *